United States Patent [19]
Dürsch et al.

[11] 3,928,591
[45] Dec. 23, 1975

[54] 7-(D-α-AMINO-1,4-CYCLOHEXADIEN-1-YLACETAMIDO)DESACETOXYCEPHALOSPORANIC ACID DIHYDRATE COMPOSITIONS

[75] Inventors: Friedrich Dürsch, Hopewell; Theodore Michael Siewarga, Parlin, both of N.J.

[73] Assignee: E. R. Squibb & Sons, Inc., Princeton, N.J.

[22] Filed: Jan. 23, 1974

[21] Appl. No.: 435,913

Related U.S. Application Data

[62] Division of Ser. No. 258,767, June 1, 1972, Pat. No. 3,819,620.

[52] U.S. Cl. .............................................. 424/246
[51] Int. Cl.² ......................................... A61K 31/51
[58] Field of Search .................................. 424/246

*Primary Examiner*—Jerome D. Goldberg
*Attorney, Agent, or Firm*—Lawrence S. Levinson; Merle J. Smith

[57] ABSTRACT

7-(D-α-amino-1,4-cyclohexadien-1-ylacetamido)desacetoxycephalosporanic acid dihydrate compositions and method for treating microbial infections are disclosed.

4 Claims, No Drawings

7-(D-α-AMINO-1,4-CYCLOHEXADIEN-1-YLACETAMIDO)DESACETOXYCEPHALOSPORANIC ACID DIHYDRATE COMPOSITIONS

This application is a division of application Ser. No. 258,767, filed June 1, 1972, U.S. Pat. No. 3,819,620 issued June 25, 1974.

Background of the Invention

A cephalosporin derivative, termed cephradine, having the following structure:

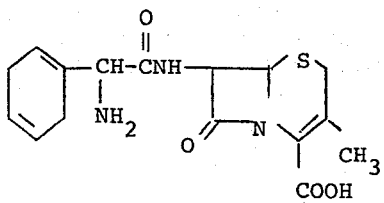

has been found to have considerable antimicrobial activity (U.S. Pat. No. 3,485,819). However, upon storage at extreme conditions, a certain amount of decomposition occurs. In addition, formulation of this compound presents certain significant problems. The compound absorbs water making weighing and preparation of unit doses rather difficult. Absorption of water after formulation can affect the appearance and quality of the final product. In order to maximize the stability, it is desirable to find forms of 7-(D-α-amino-1,4-cyclohexadien-1-ylacetamido)desacetoxycephalosporanic acid less prone to decomposing while still possessing antimicrobial properties.

This invention relates to cephradine dihydrate, a more stable form of 7-(D-α-amino-1,4-cyclohexadien-1-ylacetamido)desacetoxycephalosporanic acid, which also does not absorb water on standing thus enabling the easier preparation of pharmaceutical formulations.

In addition this invention includes methods for preparing said dihydrate, pharmaceutical compositions incorporating said dihydrate and methods for utilizing said compositions.

7-(Dα-amino-1,4-cyclohexadien-1-ylacetamido)-desacetoxycephalosporanic acid (customary cephradine) is obtained by the general procedure of U.S. Pat. 3,485,819 in the form of a material that absorbs water on standing. In order to be certain of the amount of active ingredient to be placed in various dosage forms, the moisture content of the atmosphere must be carefully controlled. However, even if the exposure to moisture can be eliminated, the final solid formulation product, especially tablets, are subject to the effects of water absorption which will lower the quality of the dosage form.

The dihydrate of this invention is a crystalline material having an X-ray diffraction pattern which is distinctly different from that of customary cephradine. The novel cephradine dihydrate crystals have the following unique X-ray diffraction properties using a copper K-α radiation source.

| Radiation with copper Kα X-rays 2θ | Intensity |
|---|---|
| 2.29 | weak |
| 2.46 | weak |
| 2.49 | very weak |
| 2.56 | very weak |
| 2.62 | weak |
| 2.64 | very weak |
| 2.67 | weak |
| 2.79 | very weak |
| 2.92 | strong |
| 2.95 | very weak |
| 3.07 | weak |
| 3.19 | medium |
| 3.41 | medium |
| 3.47 | medium |
| 3.57 | very strong |
| 3.65 | weak |
| 3.74 | weak |
| 3.78 | weak |
| 3.85 | very weak |
| 3.93 | very weak |
| 4.23 | weak |
| 4.43 | weak |
| 4.57 | very weak |
| 5.07 | medium |
| 5.20 | medium |
| 5.60 | strong |
| 5.8 | medium |
| 6.0 | very weak |
| 6.2 | medium |
| 7.0 | weak |
| 8.6 | weak |
| 10.4 | weak |
| 11.5 | strong |

In addition, the cephradine dihydrate crystals normally occur in a stout prismatic form with bulk densities up to 0.7 g/ml. In contrast, common cephradine occurs as rod shaped crystals with bulk densities generally below 0.4 g/ml.

Furthermore cephradine dihydrate differs from common cephradine by its behavior upon removal of water by vacuum drying at elevated temperatures.

The X-ray diffraction pattern of common cephradine does not change during the drying process and the dried material regains water upon exposure to the atmosphere restoring the original product. In contrast the X-ray pattern of the cephradine dihydrate does change significantly and irreversibly during the drying process.

Surprisingly the solubility in water of the dihydrate differs significantly from that of the conventional 7-(D-α-amino-1,4-cyclohexadien-1-ylacetamido)desacetoxycephalosporanic acid; while the antimicrobial activity is maintained.

The dihydrate is not readily formed directly from solid common cephradine. The general method for preparing the dihydrate utilizes a careful neutralization of a solution of a salt of the conventional 7-(D-α-amino-1,4-cyclohexadien-1-ylacetamido)desacetoxycephalosporanic acid at a temperature range of 0° to 25°C, preferably 15° to 25°C. The salt of the 7-(D-α-amino-1,4-cyclohexadien-1-ylacetamido)desacetoxycephalosporanic acid may be either an acid addition salt, such as the hydrochloride, sulfate, phosphate, citrate, tartrate, acetate, etc. or a basic salt of the carboxylic acid, such as the sodium, potassium, ammonium, triethyl amine, etc. with or without the presence of a soluble carbohydrate such as sodium carbonate and ammonium bicarbonate. The acid salts may be neutralized by the careful addition of a base such as sodium hydroxide, potassium hydroxide, etc. and the alkaline salts by the addition of an acid such as hydrochloric acid, sulfuric acid, phosphoric acid, etc. In choosing the salt to be employed and the acid or base to be added, one would utilize a combination so that a highly water soluble salt is obtained.

In order to maximize yields, it is preferred to carry out the above described procedures in the presence of seed crystals of the dihydrate.

The dihydrate finds utility as an antibiotic having the additional property of higher stability over the conventional forms. The dose range of the dihydrate is similar to other cephalosporins although minor adjustments may be made to compensate for the water content. Thus unit doses of from 0.05 g. to 2.0 g would generally be utilized, preferably 0.1 g to 1 g.

The dihydrate is most desirably administered orally, for example, with an inert diluent or with an assimilable edible carrier, or it may be enclosed in hard or soft gelatin capsules, or it may be compressed into tablets, or it may be incorporated directly with the food of the diet. For oral therapeutic administration, the active compounds of this invention may be incorporated with excipients and used in the form of tablets, troches, capsules, suspensions, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 0.1 g and 1 g of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. Of course, any material used in preparing any dosage unit form should be pharmaceutically pure and substantially non-toxic in the amounts employed.

In addition, injectable and suppository forms may be employed. A preferred injectable form utilizes a solid powder which is reconstituted at the time of administration and is described in detail in the U.S. Pat. application Ser. No. 190,325 (filed Oct. 18, 1971) which is incorporated by reference.

The invention will be described in greater detail in conjunction with the following specific examples.

EXAMPLE 1

Preparation of Cephradine Dihydrate a. Cephradine (3.00 kilograms) (U.S. Pat. No. 3,485,819) is slurried in water (20 liters) at 20°C. Solid anhydrous sodium carbonate (1.0 kilogram) is added in one portion with efficient agitation. A solution is formed within a few minutes. This solution is polish filtered through a clarifying pad and the filtrate is cooled to 15°–20°C. Concentrated hydrochloric acid (about 0.6 liters) is added over a period of about 2 hours with continuous agitation and frequent addition of small amounts of cephradine dihydrate seed crystals. The acid addition is interrupted as soon as crystal growth becomes apparent in the mixture and agitation is continued for about 1 hour. Acid addition is resumed after this period and is continued at a slow rate until the pH of the mixture shows a relatively sudden drop at about pH 6.0–5.5. Total acid consumption is about 1.4 liters. The crystal slurry is agitated for another hour at 15° to 25°C. The crystals are collected by filtration and the filter cake is washed with cold water (3 liters), followed by 80% aqueous acetone (about 10 liters). The cake is dried at room temperature in a fluidized bed dryer until the temperature difference across the bed has disappeared. Pure cephradine dihydrate is obtained (2.18 kilograms or 70 mole-%), identical in every respect with a standard sample.

b. Cephradine (23 grams) is dissolved in water (80 ml) by addition of concentrated hydrochloric acid (4.4 ml). This solution is charged into one feed tank of a crystallizer. Another feed tank is charged with aqueous sodium hydroxide solution (20% w/v). The crystallizing vessel is charged with water (50 ml.), and automatic controls are arranged for sodium hydroxide delivery to maintain pH 5.5 during the entire operation. The water in the crystallizer is cooled to about 5°C. and the acid solution of cephradine is added at a rate of about 0.5 ml. per minute. Seed crystals of cephradine dihydrate are added at short intervals until crystal growth is noticeable. Part of the crystallizing mixture may intermittently be fed through a high speed gear pump in a recycle loop to provide some grinding action on the crystals in order to expose new active crystallizing sites. The temperature is maintained at about 5°C. during the entire crystallization. The crystal slurry is agitated for about 30 minutes after termination of the additions and the crystals are isolated by filtration. The filter cake is washed with water (20 ml.) and 80% acetone (100 ml.) and the product is vacuum dried at room temperature. Pure cephradine dihydrate (18.8 grams or 78 mole-%) is obtained, identical in every respect with a standard sample.

c. Cephradine (25 grams) is slurried with water (100 ml.) and triethylamine (7.8 ml.) is added slowly until a clear solution is obtained. This solution is filtered and is charged into a feed tank of a crystallizer. A second feed tank is charged with concentrated hydrochloric acid and is connected to the crystallizer vessel by a pH controlled valve. The crystallizer vessel is charged with saturated aqueous cephradine solution at pH 5; the mother liquors of a previous crystallization run may be used (100 ml.). The temperature in the crystallizer is adjusted to about 10°C. and the pH controller is set to 5.0. The cephradine triethylamine solution is now fed to the crystallizer at a rate of about 0.5 to 1.0 ml. per minute. Finely ground seed crystals of cephradine dihydrate are added and the mixture is agitated efficiently during the crystallization. Agitation is continued for 30 minutes after the additions are complete. The crystals are separated on a filter and are washed with water (25 ml.) and 80% acetone (100 ml.). Drying affords pure cephradine dihydrate (20.8 grams or 81 mole-%), identical in every respect with a standard sample.

d. Crude cephradine (25 grams) is dissolved in water (100 ml.) by rapid addition of hydrochloric acid (4.7 ml.). The solution of pH 2.0 is polish filtered and the filtrate is charged to a crystallizer vessel. The temperature is lowered to 5° C. and the solution is agitated rapidly. Aqueous sodium hydroxide solution (20% w/v) is added dropwise, simultaneously with small amounts of finely ground cephradine dihydrate seed crystals. The sodium hydroxide addition is slowed down after the pH has reached 2.5 and the seed crystals are growing visibly. The temperature of the mixture is allowed to rise slowly to 20° C. Sodium hydroxide addition is continued until pH 5.6 is attained after about 3 hours crystallization time; total consumption is 11.0 ml. The slurry is agitated for another hour and the crystals are collected on a filter. The cake is washed with water (10 ml.) and 80% aqueous acetone (100 ml.) and is dried in a fluidized bed for 15 minutes at room temperature. Pure cephradine dihydrate (23.2 grams or 88 mole-%) is obtained, identical in every respect with an authentic sample.

EXAMPLE 2

Preparation of capsule formulation

| Ingredient | Milligrams per Capsule |
|---|---|
| 7-(D-$\alpha$-amino-1,4-cyclohexadien-1-ylacetamido)desacetoxy-cephalosporanic acid dihydrate | 400 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 3

Preparation of tablet formulation

| Ingredient | Milligrams per Tablet |
|---|---|
| 7-(D-$\alpha$-amino-1,4-cyclohexadien-1-ylacetamido)desacetoxy-cephalosporanic acid dihydrate | 300 |
| Lactose | 200 |
| Corn starch (for mix) | 50 |
| corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 50°C. The dry granules are passed through a No. 16 screen. The mixture is lubricated with magnesium stearate and compressed into tablets in a suitable tableting machine. Each tablet contains 300 milligrams of active ingredient.

What is claimed is:

1. A therapeutic composition in unit dosage form useful as an antimicrobial agent in mammals which comprises about 0.05 to about 2 g. of 7-(D-$\alpha$-amino-1,4-cyclohexadien-1-ylacetamido)desacetoxycephalosporanic acid dihydrate and a pharmaceutical carrier.

2. The composition of claim 1 wherein said unit dosage is from about 0.1 to about 1.0 g.

3. A method for treating microbial infections in mammals which comprises administering orally or by injection an anti-microbially effective amount of said composition of claim 1.

4. The method of claim 3 wherein the unit dosage is from about 0.1 to about 1.0 g.

* * * * *